(12) United States Patent
Moss

(10) Patent No.: US 7,945,467 B2
(45) Date of Patent: May 17, 2011

(54) METHOD FOR DISCERNING AND COMMUNICATING ORGANIZATION'S CULTURE/POSTURE TOWARDS BUSINESS ENVIRONMENT THROUGH SEGMENTED QUESTIONNAIRES

(75) Inventor: Harold Moss, Danvers, MA (US)

(73) Assignee: International Business Machines Corporation, Armonk, NY (US)

( * ) Notice: Subject to any disclaimer, the term of this patent is extended or adjusted under 35 U.S.C. 154(b) by 1311 days.

(21) Appl. No.: 11/464,231

(22) Filed: Aug. 14, 2006

(65) Prior Publication Data
US 2008/0040169 A1    Feb. 14, 2008

(51) Int. Cl.
*G06F 11/34*    (2006.01)
(52) U.S. Cl. ............................. 705/7.38; 705/317
(58) Field of Classification Search ............... 705/1, 7, 705/10, 11, 7.38, 317
See application file for complete search history.

(56) References Cited

U.S. PATENT DOCUMENTS

| | | | | |
|---|---|---|---|---|
| 5,890,139 | A | 3/1999 | Suzuki et al. | ............ 705/27 |
| 6,175,833 | B1 | 1/2001 | West et al. | ............ 707/102 |
| 2002/0198801 | A1* | 12/2002 | Dixon et al. | ............ 705/35 |
| 2005/0071185 | A1* | 3/2005 | Thompson | ............ 705/1 |
| 2007/0192236 | A1* | 8/2007 | Futch et al. | ............ 705/38 |
| 2007/0202483 | A1* | 8/2007 | Castelli et al. | ............ 434/350 |
| 2007/0276678 | A1* | 11/2007 | Nichols | ............ 705/1 |

OTHER PUBLICATIONS

"Risk Map Showing Mitigation Action" retrieved from [URL: http://www.nacubo.org/documents/bom/BOM1208_ERM1_FIGURE_2.pdf] on Dec. 6, 2010.*
"Risk Assessment Survey and Risk Mapping Tool" retrieved from [URL: www.auditnet.org/docs/risk1.doc] on Dec. 6, 2010.*
Stone, David L. "Technological Risk Assessment at Zions Bancorporation." Risk Management, vol. 49, No. 10, p. 36, Oct. 2002.*
Then, Danny Shiem-Shin. "A Conceptual Framework for Describing Built Assets Maintenance Standards." Facilities, vol. 14, No. 7/8, p. 12, Jul./Aug. 1996.*
Keil, Mark et al. "A Framework for Identifying Software Project Risks." Communications of the ACM, vol. 41, No. 11, p. 76, Nov. 1998.*
Dolinsky, Arthur L. "Complaint Intensity and Health Care Services." Journal of Health Care Marketing, vol. 15, No. 2, p. 42, Summer 1995.*

* cited by examiner

*Primary Examiner* — Susanna M Diaz
(74) *Attorney, Agent, or Firm* — Hamilton & Terrile, LLP; Stephen A. Terrile

(57) ABSTRACT

A method, apparatus and computer-usable medium for a policy guidance system comprising one or more Cartesian coordinate plots of a policy's adherence and compliance guidelines. One or more segmented questionnaires are created, comprising a range of weighted responses, that are electronically distributed to one or more predetermined reviewers such as, but not limited to, policy makers or enforcers. Responses to the questionnaire are aggregated, statistically analyzed and scored to derive quantitative values that are then graphically plotted as one or more coordinates in a Cartesian format. The resulting graphical depiction of the policy's guidance parameters is then presented such that it facilitates a policy viewer's comprehension of the possible implications of noncompliance.

11 Claims, 14 Drawing Sheets

METHOD FOR DISCERNING AND COMMUNICATING ORGANIZATION'S CULTURE/POSTURE TOWARDS BUSINESS ENVIRONMENT THROUGH SEGMENTED QUESTIONNAIRES

BACKGROUND OF THE INVENTION

1. Field of the Invention

The present invention relates in general to the field of computers and similar technologies, and in particular to software utilized in this field. Still more particularly, the present invention relates to communicating policy guidance.

2. Description of the Related Art

Today's regulatory environment continues to increase in complexity as a result of government legislation and industry rules that often drive, augment or complement an organization's internal policies. This situation can result in an overabundance of policies that are often contradictory not just to each other, but to overriding laws and regulations. Not only is this policy environment difficult to administer, but it is equally challenging for individuals within the organization to understand what constitutes acceptable versus unacceptable behavior for any given policy.

While an organization's rules and policies generally make sense when viewed in the context of the events that resulted in their creation, they can also be vague, ambiguous, confusing, or even worse, highly subject to interpretation by the individuals they are intended to guide. Furthermore, while an individual may know that a policy exists and that they need to abide by it, they may not know how they will be measured for compliance or worse yet, the degree to which they will be penalized for not abiding by the policy. Furthermore, if they don't understand the policy, or understand what is expected of them, they don't know where to find the answer.

Currently, organizational policies are generally communicated or reviewed using complex written documents that can be subjectively interpreted in many ways and fail to provide appropriate guidance. This approach can result in the creation of an administrative environment that often requires continuous oversight and ongoing management. In view of the foregoing, there is a need for easily and clearly communicating the guidelines of a given policy to the individuals the policy affects while simultaneously defining their expected and acceptable behavior and the corresponding consequences for noncompliance.

SUMMARY OF THE INVENTION

The present invention includes, but is not limited to, a method, system and computer-usable medium for a policy guidance system comprising one or more Cartesian coordinate plots of a policy's adherence and compliance guidelines. In different embodiments of the invention, one or more segmented questionnaires are created, comprising a range of weighted responses, that are electronically distributed to one or more predetermined reviewers such as, but not limited to, policy makers or enforcers. Responses to the questionnaire are aggregated, statistically analyzed and scored to derive quantitative values that are then graphically plotted as one or more coordinates in a Cartesian format. The resulting graphical depiction of the policy's guidance parameters is then presented such that it facilitates a policy viewer's comprehension of the possible implications of noncompliance.

In one embodiment of the invention, the Cartesian policy depiction graphically delineates expected and acceptable behavior and the corresponding consequences for noncompliance. As an example, an employee that is uncertain of what constitutes inappropriate behavior under the company's sexual harassment policy can quickly ascertain that an inappropriate email can result in a reprimand, and that inappropriate physical contact can result in termination, simply by viewing the policy's Cartesian guidance depiction. In another embodiment of the invention, the implications of failing to comply with different policies is graphically depicted in relative terms (e.g., risk, priority, etc.) as one or more Cartesian coordinate plots. For example, based on statistical analysis of responses to a policy questionnaire, the filing of employee withholding taxes according to Internal Revenue Service (IRS) guidelines is depicted being a high priority to the Chief Financial Officer (CFO), with failure to comply also being depicted as a high risk to the company. Similarly, based on the responses to a different questionnaire, acknowledging yearly service anniversaries can be depicted as a high priority to the Human Resources (HR) department, with failure to do so simultaneously depicted as low risk to the company.

In different embodiments of the invention, a policy's Cartesian guidance depiction is updated on an ongoing basis as a result of subsequent review and modification of the policy. In other embodiments of the invention, a policy's Cartesian guidance depiction is updated as a result of new or subsequent questionnaires being distributed, with their relevant and corresponding responses analyzed, quantified, and incorporated as appropriate into modifications of the policy. In one embodiment of the invention, a policy's Cartesian guidance depiction is presented whenever the policy is electronically accessed (e.g., through a web browser) to visually facilitate a policy viewer's comprehension of the policy's compliance guidelines. In another embodiment of the invention, a policy's Cartesian guidance depiction comprises a policy monitoring and enforcement system and is automatically displayed if an employee's use of computing or network resources would result in being noncompliant with the referenced policy. As an example, the Cartesian guidance depiction for the inappropriate use policy for corporate network and computing resources can be displayed on the employee's computer monitor if they attempted to download software or files from an unapproved Internet site. As another example, the Cartesian guidance depiction for a company's appropriate customer correspondence policy can be displayed on a broker's screen if words, terms, or phrases proscribed by the Securities Exchange Commission (SEC) are entered into an email referencing the potential sale or purchase of a publicly traded stock to a customer of the brokerage. The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
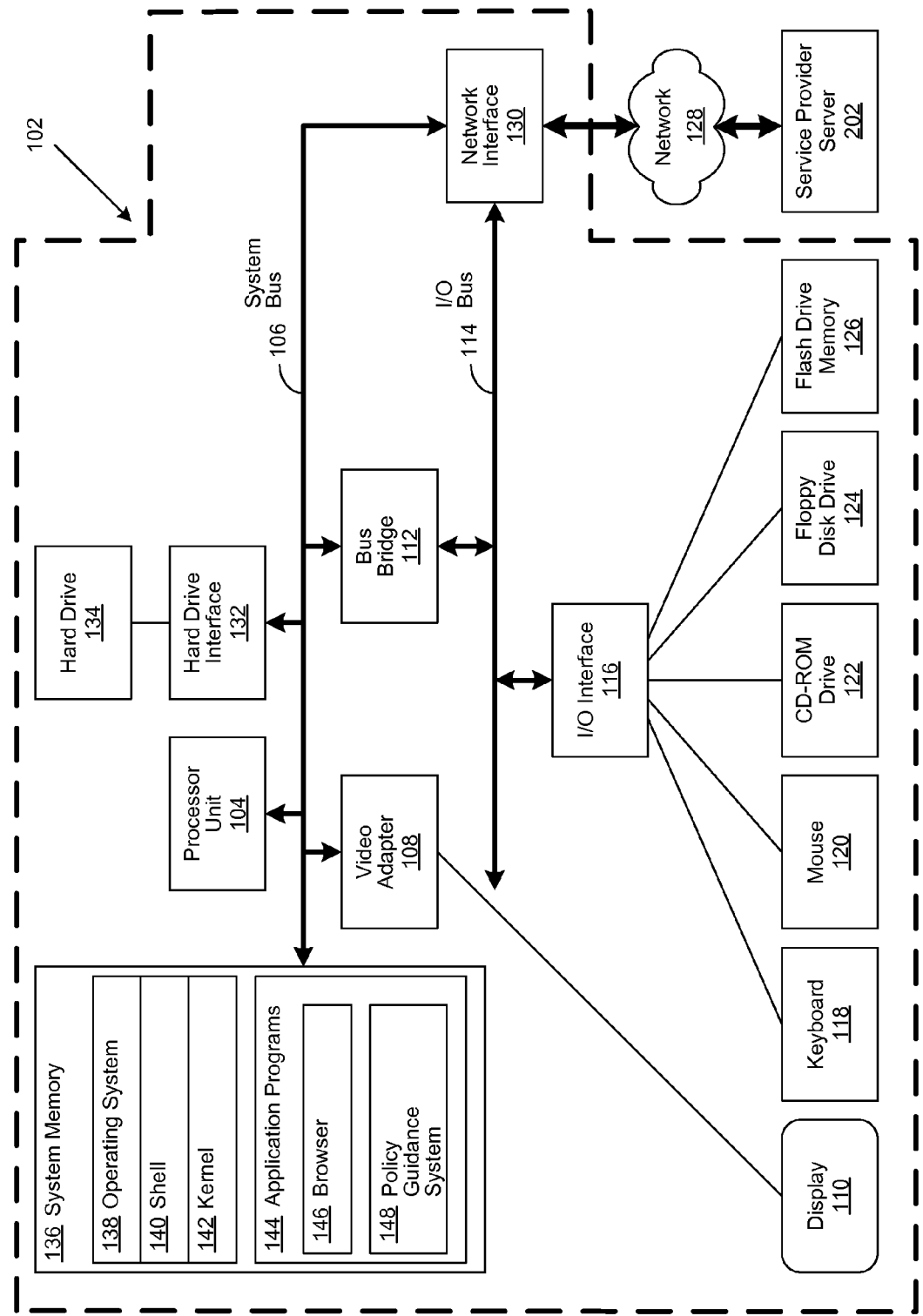
FIG. 1 depicts an exemplary client computer in which the present invention may be implemented.

With reference now to the figures, and in particular to FIG. 1, there is depicted a policy guidance system for presenting one or more Cartesian coordinate plots of a policy's adherence and compliance guidelines. In different embodiments of the invention, responses to one or more segmented questionnaires are aggregated, statistically analyzed, scored, and then presented such that the policy viewer's comprehension of the policy's guidance parameters is facilitated.

With reference now to FIG. 1, there is depicted a block diagram of an exemplary client computer 102, in which the present invention may be utilized. Client computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 416 may be any known to those skilled in the art of computer architecture, including but not limited to Universal Serial Bus (USB) ports.

Client computer 102 is able to communicate with a service provider server 202 via a network 128 using a network interface 130, which is coupled to system bus 106. Network 128 may be an external network such as the Internet, or an internal network such as an Ethernet or a Virtual Private Network (VPN). Using network 128, client computer 102 is able to use the present invention to access service provider server 202.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 202.

Application programs 144 in client computer 102's system memory also include a policy guidance system 148. Policy guidance system 148 includes code for implementing the processes described in FIG. 3. In one embodiment, client computer 102 is able to download policy guidance system 148 from service provider server 202.

The hardware elements depicted in client computer 102 are not intended to be exhaustive, but rather are representative to highlight essential components required by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
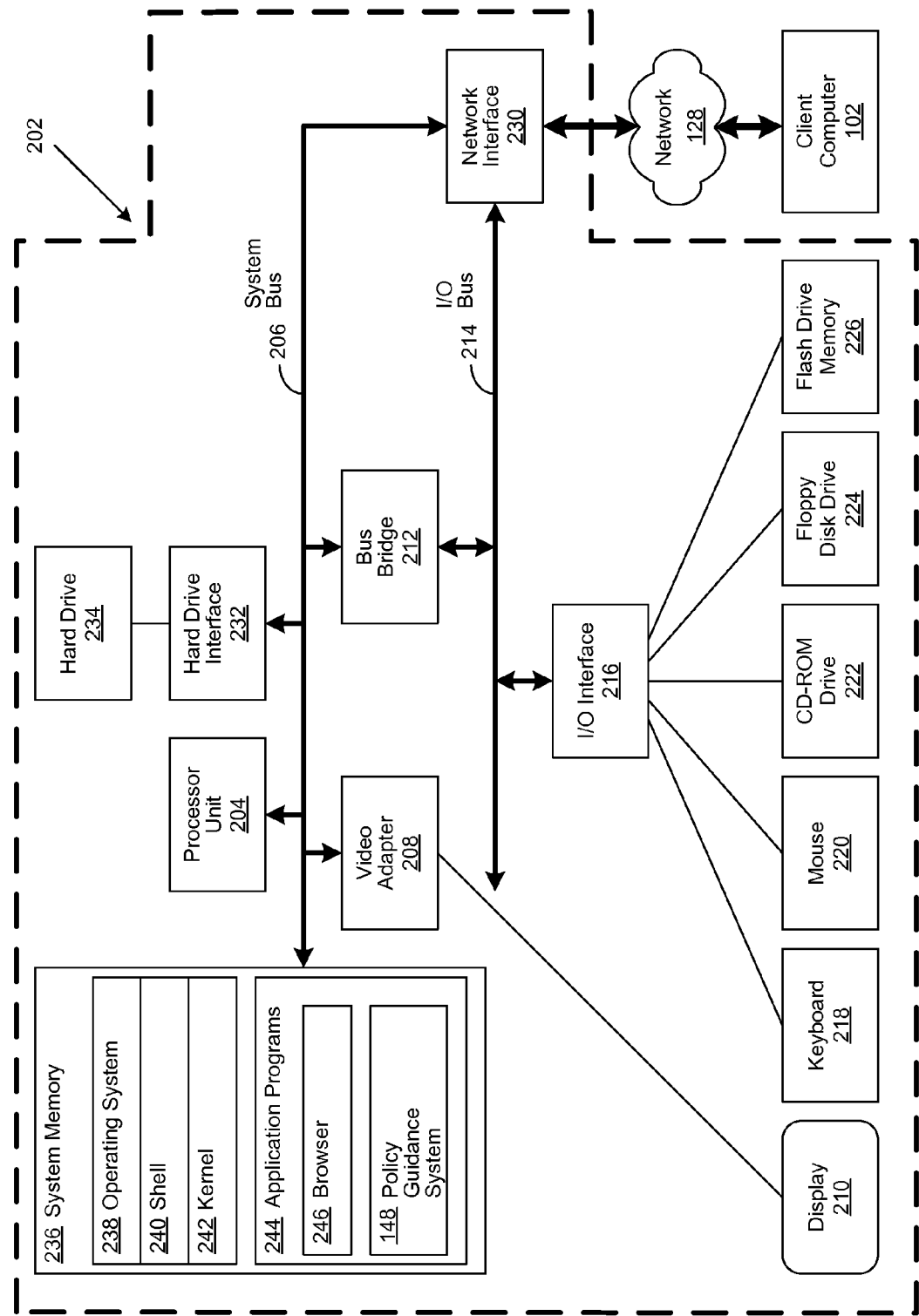
FIG. 2 illustrates an exemplary server from which software for executing the present invention may be deployed and/or implemented for the benefit of a user of the client computer shown in FIG. 2.

As noted above, policy guidance system 148 can be downloaded to client computer 202 from service provider server 202, shown in exemplary form in FIG. 2. Service provider server 202 includes a processor unit 204 that is coupled to a system bus 206. A video adapter 208 is also coupled to system bus 206. Video adapter 208 drives/supports a display 210. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Service provider server 202 is able to communicate with client computer 102 via network 128 using a network interface 230, which is coupled to system bus 206. Access to network 128 allows service provider server 202 to execute and/or download policy guidance system 148 to client computer 102.

System bus 206 is also coupled to a hard drive interface 232, which interfaces with a hard drive 234. In a preferred embodiment, hard drive 234 populates a system memory 236, which is also coupled to system bus 206. Data that populates system memory 236 includes service provider server 202's operating system 238, which includes a shell 240 and a kernel 242. Shell 240 is incorporated in a higher level operating system layer and utilized for providing transparent user access to resources such as application programs 244, which include a browser 246, and a copy of policy guidance system 148 described above, which can be deployed to client computer 102.

The hardware elements depicted in service provider server 202 are not intended to be exhaustive, but rather are representative to highlight essential components required by the present invention. For instance, service provider server 202 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 202 performs all of the functions associated with the present invention (including execution of policy guidance system 148), thus freeing client computer 102 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Figure 3:
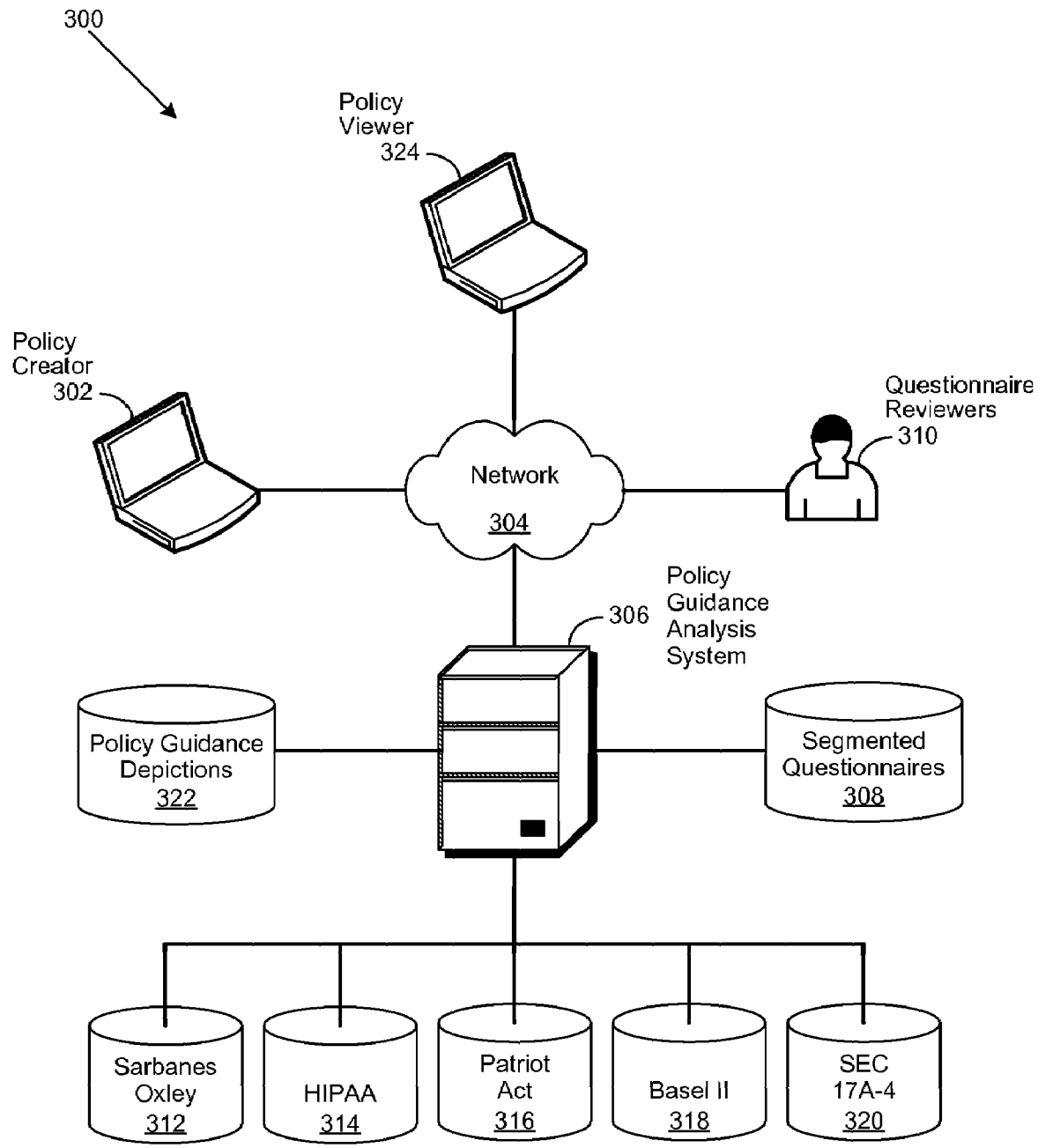
FIG. 3 is a generalized block diagram depicting a policy guidance system as implemented in accordance with an embodiment of the invention.

FIG. 3 is a generalized block diagram depicting a policy guidance system 300 as implemented in accordance with an embodiment of the invention. In this embodiment of the invention, policy creator 302 accesses policy guidance analysis system 306 through network 304 to create one or more segmented questionnaires 308, comprising a range of weighted responses. Questionnaires are created by referencing guidelines comprising one or more policy repositories such as, but not limited to a Sarbanes-Oxley repository 312, Health Information Portability and Accountability Act (HIPAA) repository 314, Patriot Act repository 316, Basel II repository 318, or SEC 17A-4 repository 320. The Sarbanes-Oxley Act repository 312 stores information regarding the Sarbanes-Oxley Act which addresses corporate fraud. The HIPPA repository 314 stores information regarding the Health Information Portability and Accountability Act (HIPAA) which addresses the privacy and security of patient's medical information. The Patriot Act repository 316 stores information regarding the Patriot Act which addresses countering a broad range of terrorist threats. The Basel II repository 318 stores information regarding the Basel II which addresses establishing the standards for measuring the adequacy of a bank's capital. The SEC 17A-4 repository 320 stores information regarding SEC 17A-4 which addresses secure electronic storage of securities trading records.

Once created, as described in greater detail hereinbelow, questionnaires 308 are electronically distributed, typically through network 304, to one or more predetermined questionnaire reviewers 310 such as, but not limited to, policy makers or enforcers. Responses from questionnaire reviewers 310 to segmented questionnaires 308 are aggregated, statistically analyzed and scored by a policy guidance analysis system 306 to derive quantitative values that are then graphically plotted as one or more coordinates in a Cartesian format. The resulting policy depictions 322 of the policy's guidance parameters are then presented to facilitate a policy viewer's 324 comprehension of the possible implications of noncompliance. In different embodiments of the invention, a policy's Cartesian guidance depiction 322 is updated on an ongoing basis as a result of subsequent review and modification of the policy. In other embodiments of the invention, a policy's Cartesian guidance depiction 322 is updated as a result of new or subsequent questionnaires 308 being distributed, with their relevant and corresponding responses analyzed, quantified, and incorporated by policy guidance analysis system 306 as appropriate into modifications of the policy.

In one embodiment of the invention, a policy's Cartesian guidance depiction 322 is presented whenever the policy is electronically accessed (e.g., through a web browser) to visually facilitate a policy viewer's 324 comprehension of the policy's compliance guidelines. In another embodiment of the invention, a policy's Cartesian guidance depiction 322 comprises a policy monitoring and enforcement system and is automatically displayed if an employee's use of computing or network resources would result in noncompliance with the referenced policy.

Figure 4:
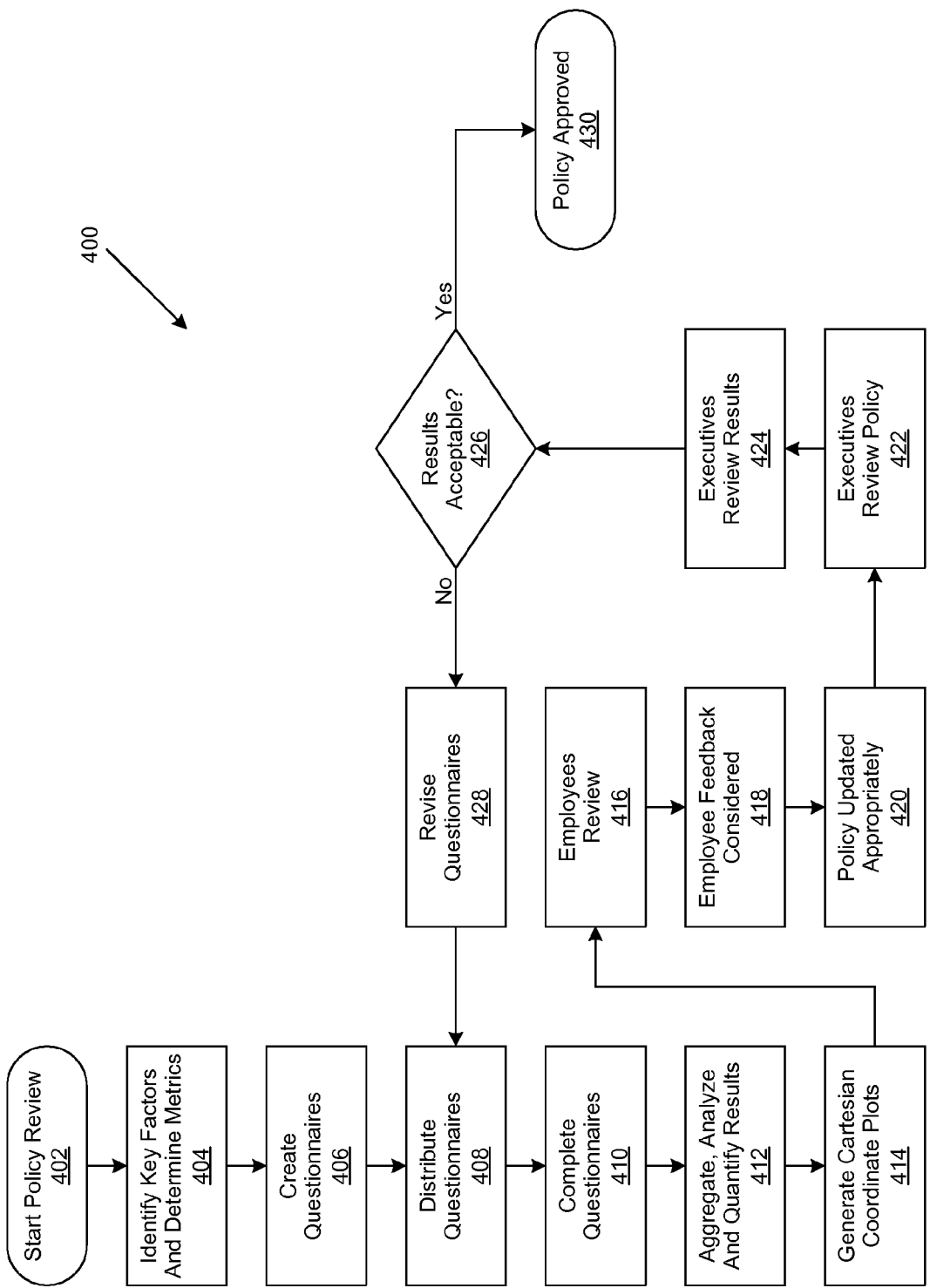
FIG. 4 is a generalized flow chart of a policy guidance system as implemented in accordance with an embodiment of the invention.

FIG. 4 is a generalized flow chart of a policy guidance system 400 as implemented in accordance with an embodiment of the invention. In this embodiment of the invention, review of a policy begins in Step 402 with key factors and metrics determined in Step 404. Segmented questionnaires, comprising a range of weighted responses as described in greater detail hereinbelow, are then created in Step 406 and electronically distributed to one or more predetermined reviewers such as, but not limited to, policy makers or enforcers in Step 408. The segmented questionnaires are completed in Step 410 and associated responses are aggregated and statistically analyzed in Step 412 such that a scoring algorithm derives quantitative values that are then graphically plotted as one or more coordinates in a Cartesian format in Step 414. The resulting graphical depiction of the policy's guidance parameters is then presented for employee review in Step 416 with their feedback considered in Step 418.

The policy is updated or modified as appropriate in Step 420 and presented to policy approvers (e.g., corporate executives, compliance officers, etc.) for their review in Step 422 and also for comparison and review of questionnaire results in Step 424 such that a determination can be made in Step 426 whether the results of the policy guidance depiction process are acceptable. If the results are acceptable, the policy is approved in Step 430. Otherwise, the appropriate segmented questionnaires are revised in Step 428 and the process is repeated, beginning with Step 408 until acceptable results are determined to have been achieved in Step 426, at which time the policy is approved in Step 430.

Figure 5:
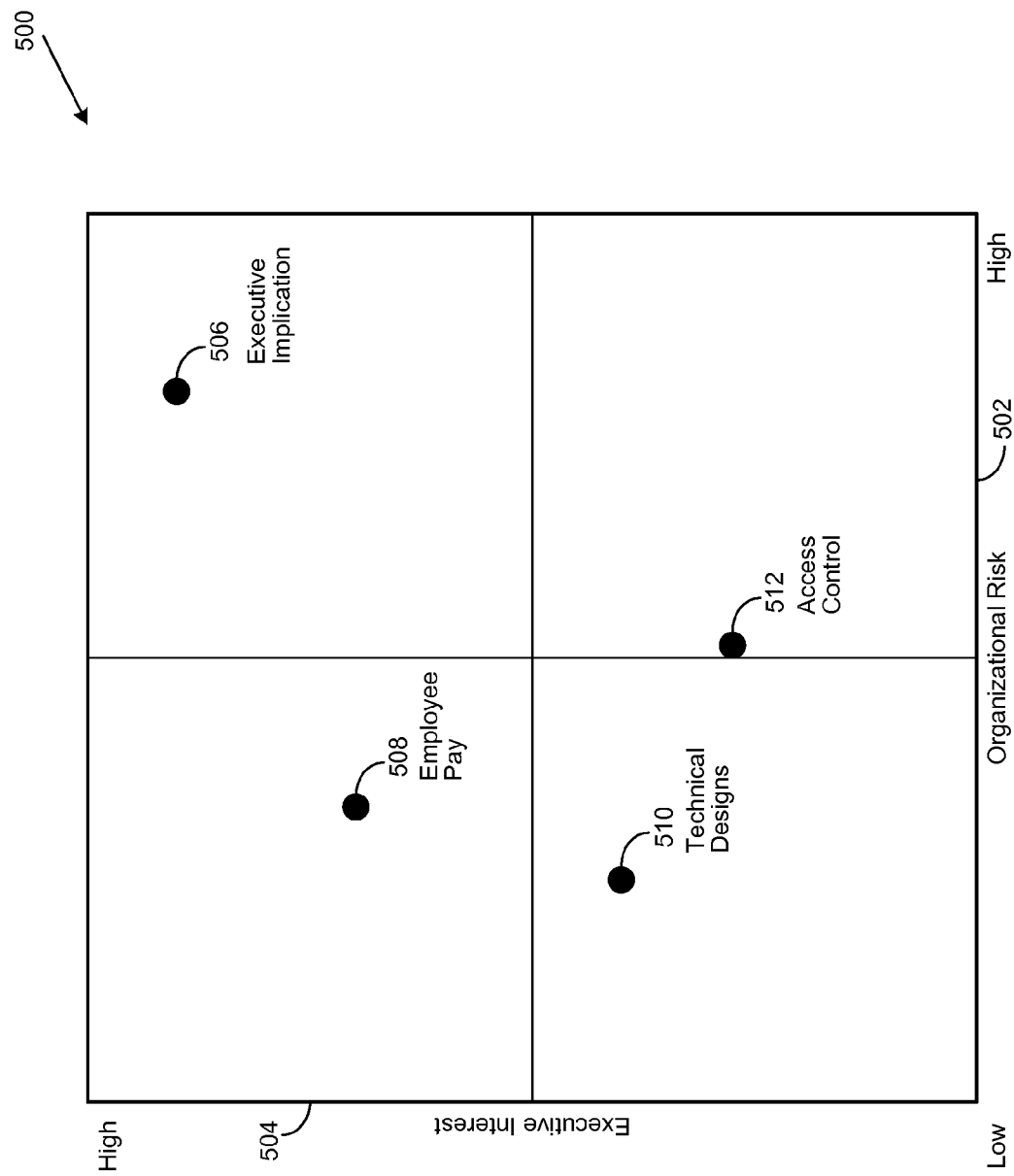
FIG. 5 shows an example presentation of a general policy guidance as implemented in accordance with an embodiment of the invention.

FIG. 5 shows an example presentation of general policy guidance 500 as implemented in accordance with an embodiment of the invention. In this embodiment of the invention, general policy guidance depiction 500 comprises 'X' axis 502 delineating the degree of organizational risk from "low" to "high" and 'Y' axis 504 similarly delineating the degree of executive interest from "low" to "high".

Policy guidance depiction 500 likewise comprises policy depictions of executive implication 506, employee pay 508, technical designs 510, and access control 512. The relative positioning of policy depictions 506, 508, 510, and 512 are determined as a result of graphically plotting quantitative values derived by the policy guidance analysis system from aggregated and statistically analyzed questionnaire responses as coordinates in the Cartesian format. As an example, the CEO of an organization receives a questionnaire containing the following questions:

Question 1: On a scale of 1 to 5, if a material weakness were found in your organization, would you fire your CFO?

Question 2: You find that your Vice President of ACH loans approved loans of a chronic late payer. What would you do? (1 Fire, 2 Reprimand, 3 Accept as isolated instance and monitor, 4 Ignore is less than 1 million dollars, 5 Ignore and accept as part of business)

Question 3: On a scale of 1 to 5 how much do you understand the technology leveraged in your company?

Question 4: On a scale of 1 to 5, do you think you can improve the safety of customer information?

Question 5: In the event of a security breach, do you (1 Send an email to the CFO, 2 Send and email to the CFO, 3 Send an email to the department head, 4 Call the client representative, 5 Call an all hands meeting with the executive team)?

In this example, each of the questions has varying weights relative to 'X' axis 502, delineating the degree of organizational risk from 'low' to 'high', and 'Y' axis 504, similarly delineating the degree of executive interest from 'low' to 'high'. For example, question 2 is relates to the CEO's risk posture regarding executive implication policy depiction 506, which visually indicates high executive interest and high risk to the organization. Question 3 on the other hand, relates to the CEO's respective interest in technology and security policy depictions 510 and 512, which visually indicate low to moderate executive interest and low to moderate risk to the organization. In this same example, responses to questionnaires distributed to others on the executive team are aggregated, analyzed, and scored to depict other policy depictions (e.g., employee pay 508) on the Cartesian plot.

Figure 6:
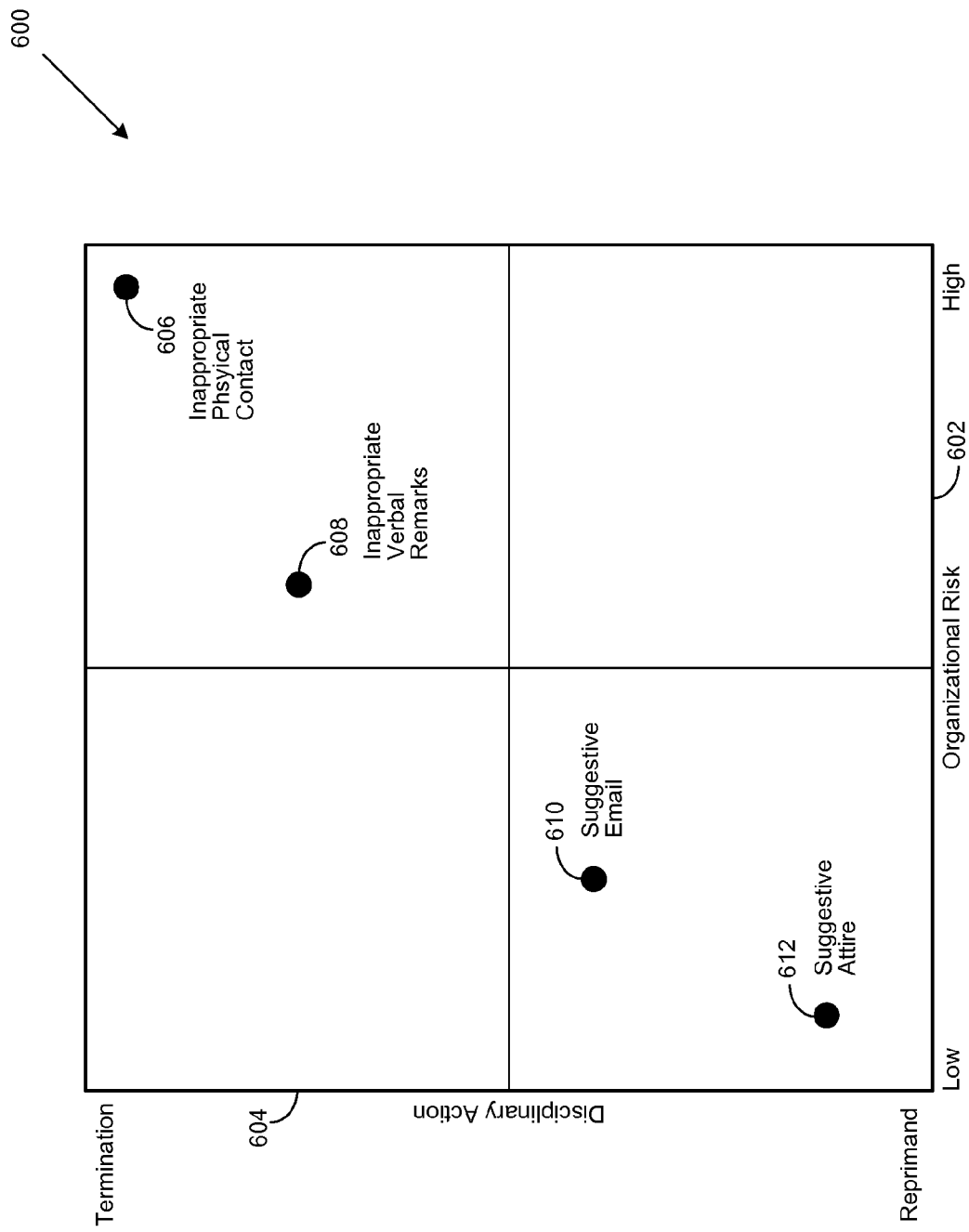
FIG. 6 shows an example presentation of a harassment policy guidance as implemented in accordance with an embodiment of the invention.

FIG. 6 shows an example presentation harassment policy guidance depiction 600 as implemented in accordance with an embodiment of the invention. In this embodiment of the invention, harassment policy guidance depiction 600 comprises 'X' axis 602 delineating the degree of organizational risk from 'low' to 'high' and 'Y' axis 604 similarly delineating the severity of disciplinary action from 'reprimand' to 'termination'. Policy guidance depiction 600 likewise comprises policy depictions of inappropriate physical contact 606, inappropriate verbal remarks 608, suggestive email 610, and suggestive attire 612. In this embodiment of the invention, policy depictions 606, 608, 610, and 612 graphically delineate expected and acceptable behavior and the corresponding consequences for noncompliance with an organization's harassment policy.

As an example, an employee that is uncertain of what constitutes inappropriate behavior under the company's harassment policy can quickly ascertain that an inappropriate or suggestive email 610 can result in a reprimand and that inappropriate physical contact 606 can result in termination, simply by viewing the policy's Cartesian guidance depiction. The relative positioning of policy depictions 606, 608, 610, and 612 are determined as a result of graphically plotting quantitative values derived by the policy guidance analysis system 306 from aggregated and statistically analyzed questionnaire responses as coordinates in the Cartesian format.

Thus, the method described herein, and in particular as shown and described in FIG. 4 can be deployed as process software from service provider server 202 to client computer 102.

Figure 7A:
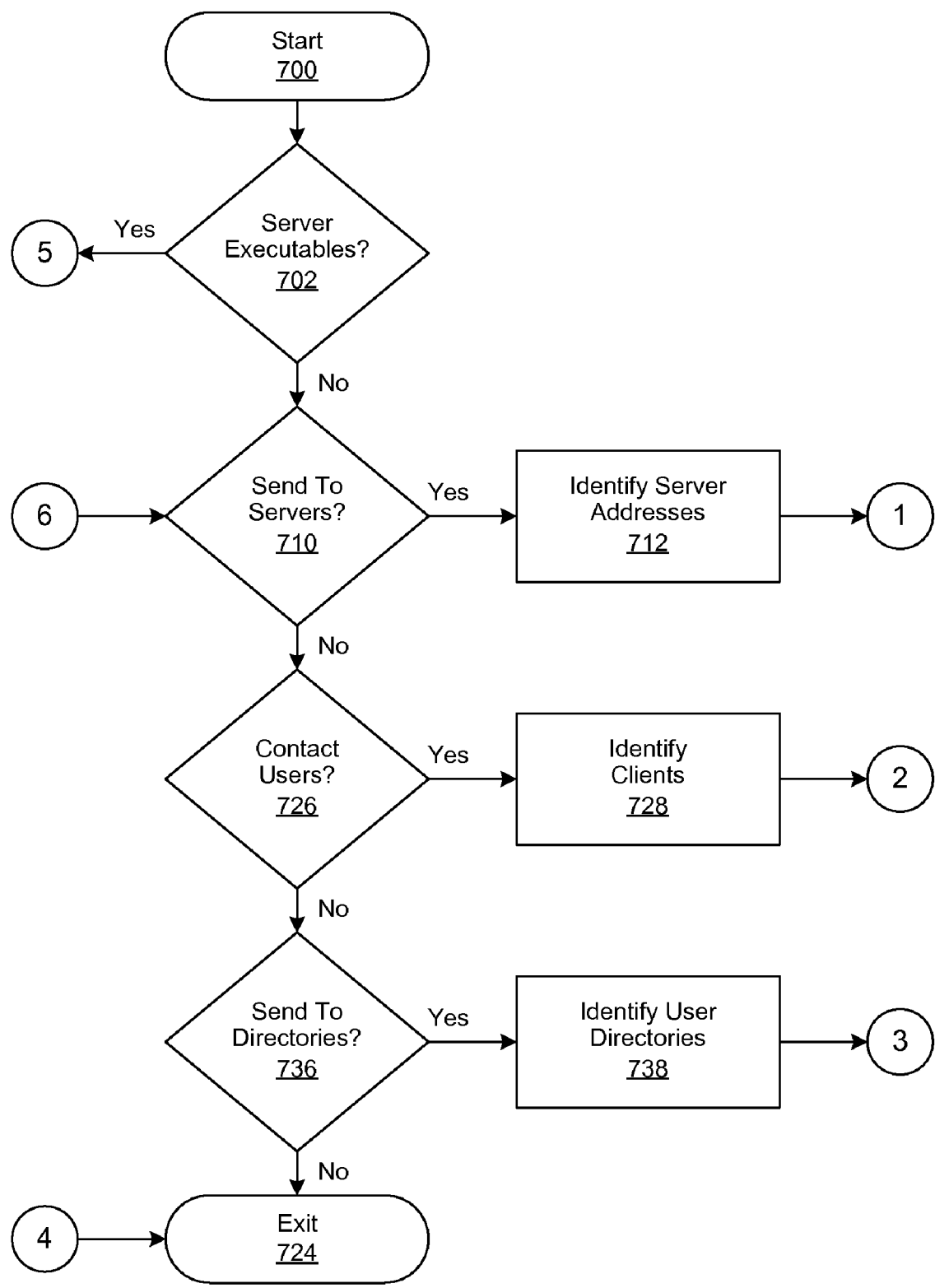
FIGS. 7*a-b* show a flow-chart of steps taken to deploy software capable of executing the steps shown and described in FIG. 2.
Figure 7B:
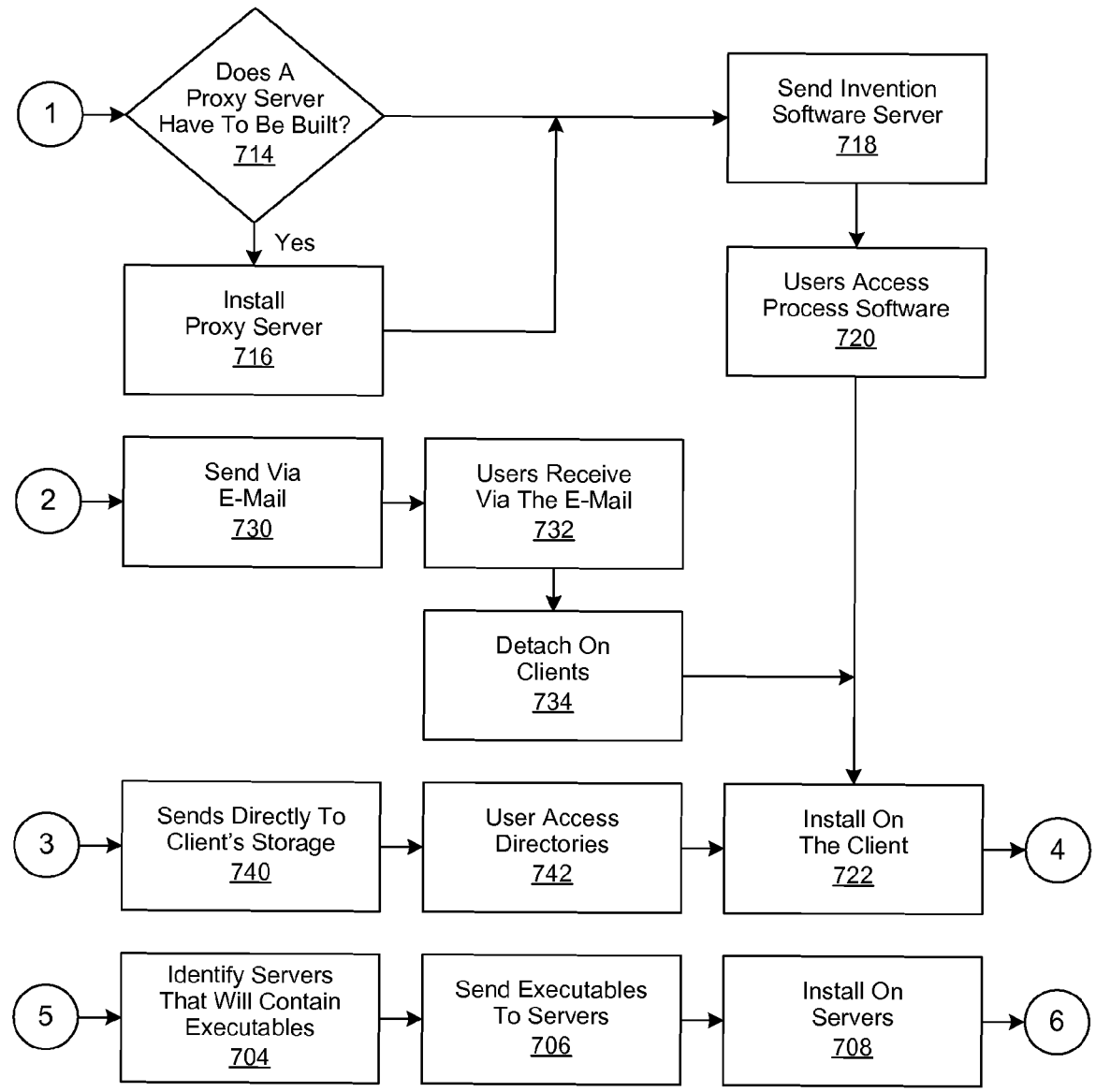

Referring then to FIG. 7, step 700 begins the deployment of the process software. The first thing is to determine if there are any programs that will reside on a server or servers when the process software is executed (query block 702). If this is the case, then the servers that will contain the executables are identified (block 704). The process software for the server or servers is transferred directly to the servers' storage via File Transfer Protocol (FTP) or some other protocol or by copying through the use of a shared file system (block 706). The process software is then installed on the servers (block 708).

Next, a determination is made on whether the process software is to be deployed by having users access the process software on a server or servers (query block 710). If the users are to access the process software on servers, then the server addresses that will store the process software are identified (block 712).

A determination is made if a proxy server is to be built (query block 714) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 716). The process software is sent to the servers either via a protocol such as FTP or it is copied directly from the source files to the server files via file sharing (block 718). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 720). Another embodiment is to have the servers automatically copy the process software to each client and then run the installation program for the process software at each client computer. The user executes the program that installs the process software on his client computer (block 722) then exits the process (terminator block 724).

In query step 726, a determination is made whether the process software is to be deployed by sending the process software to users via e-mail. The set of users where the process software will be deployed are identified together with the addresses of the user client computers (block 728). The process software is sent via e-mail to each of the users' client computers (block 730). The users then receive the e-mail (block 732) and then detach the process software from the e-mail to a directory on their client computers (block 734). The user executes the program that installs the process software on his client computer (block 722) then exits the process (terminator block 724).

Lastly a determination is made on whether to the process software will be sent directly to user directories on their client computers (query block 736). If so, the user directories are identified (block 738). The process software is transferred directly to the user's client computer directory (block 740). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 742). The user executes the program that installs the process software on his client computer (block 722) and then exits the process (terminator block 724).

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 8A:
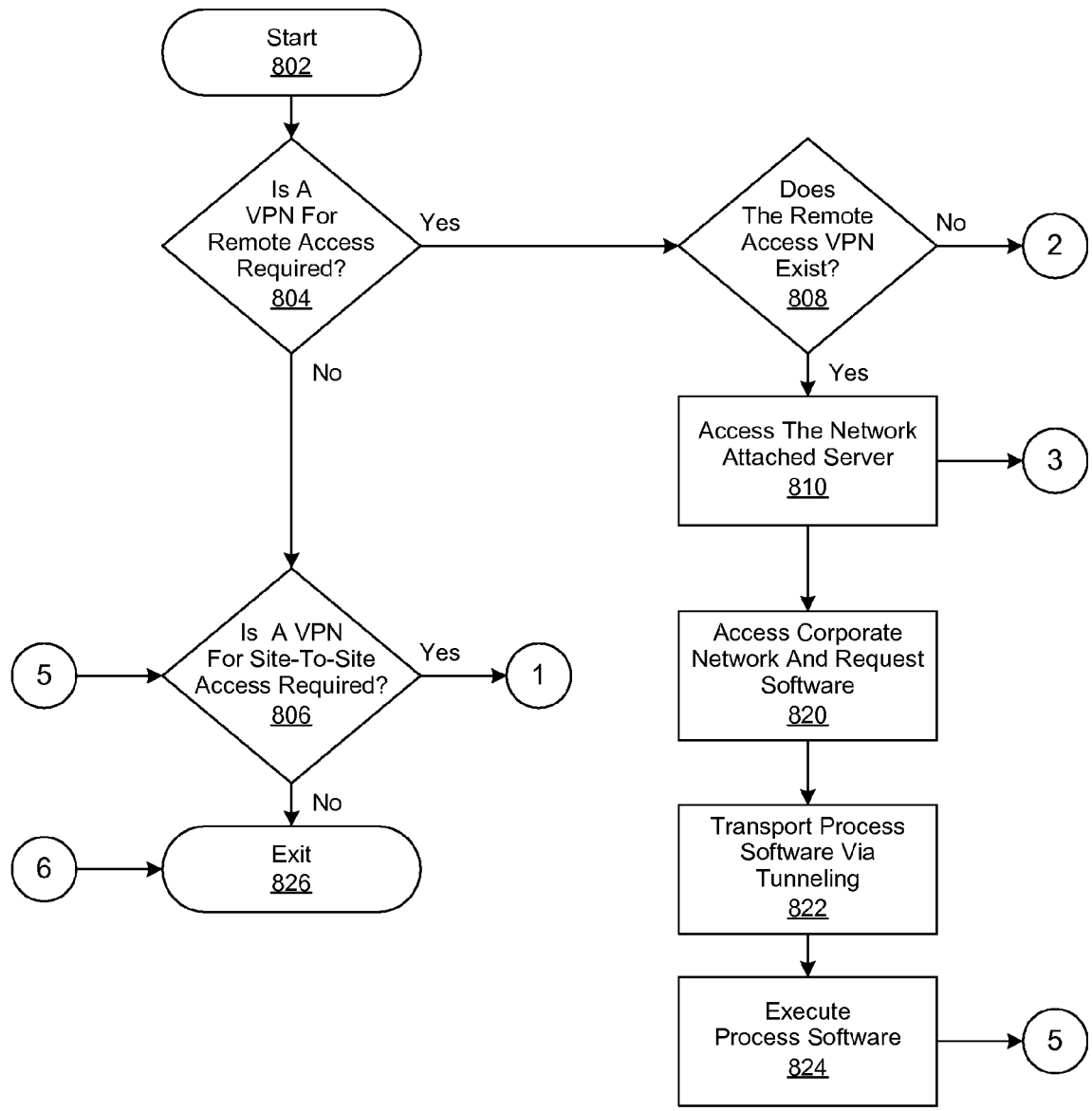
FIGS. 8*a-c* show a flow-chart of steps taken to deploy in a Virtual Private Network (VPN) software that is capable of executing the steps shown and described in FIG. 2.
Figures 8B, 8C:
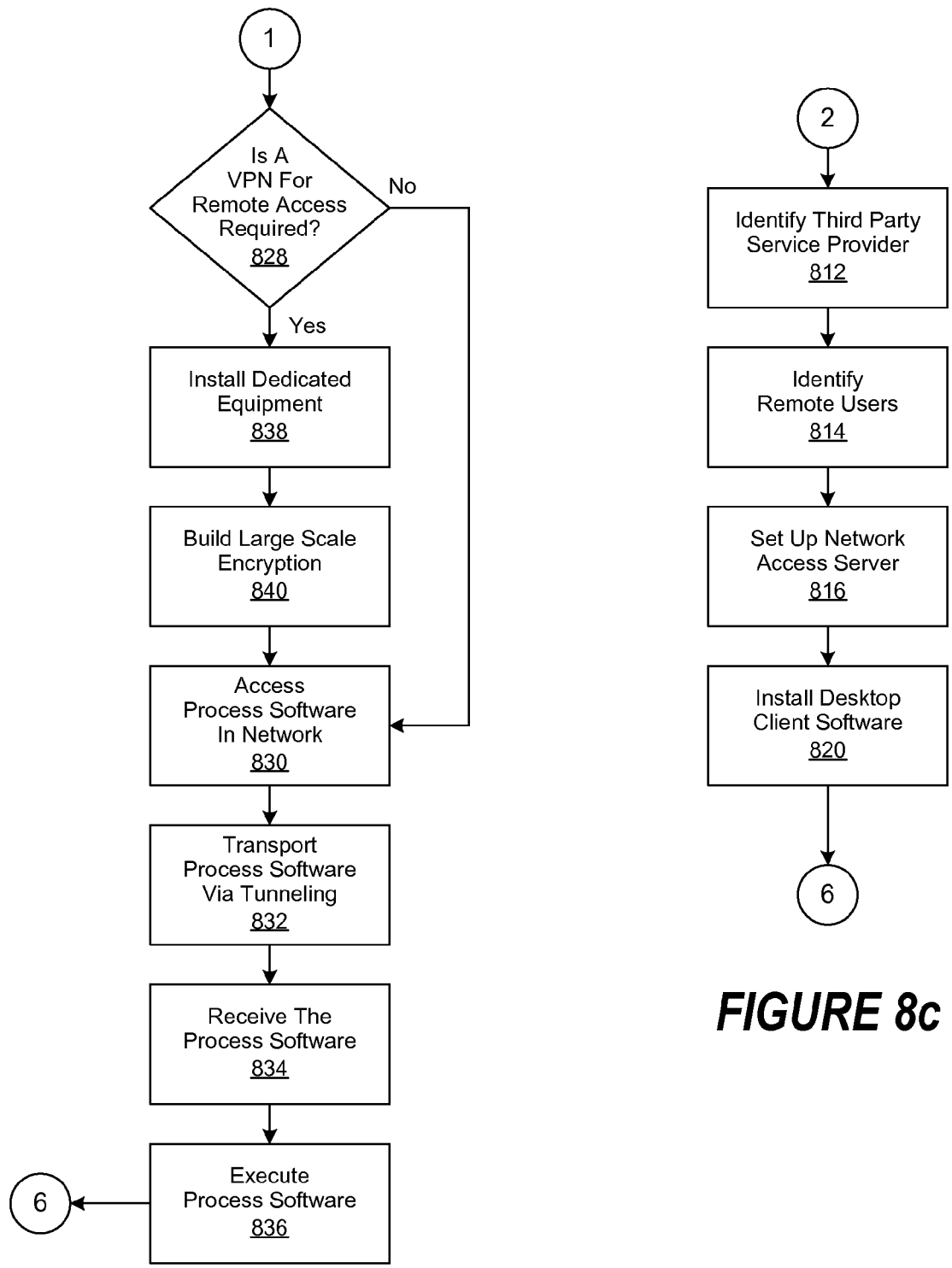

The process for such VPN deployment is described in FIG. 8. Initiator block 802 begins the Virtual Private Network (VPN) process. A determination is made to see if a VPN for remote access is required (query block 804). If it is not required, then proceed to query block 806. If it is required, then determine if the remote access VPN exists (query block 808).

If a VPN does exist, then proceed to block 810. Otherwise identify a third party provider that will provide the secure, encrypted connections between the company's private network and the company's remote users (block 812). The company's remote users are identified (block 814). The third party provider then sets up a network access server (NAS) (block 816) that allows the remote users to dial a toll free number or attach directly via a broadband modem to access, download and install the desktop client software for the remote-access VPN (block 818).

After the remote access VPN has been built or if it been previously installed, the remote users can access the process software by dialing into the NAS or attaching directly via a cable or DSL modem into the NAS (block 810). This allows entry into the corporate network where the process software is accessed (block 820). The process software is transported to the remote user's desktop over the network via tunneling. That is, the process software is divided into packets and each packet including the data and protocol is placed within another packet (block 822). When the process software arrives at the remote user's desktop, it is removed from the packets, reconstituted and then is executed on the remote user's desktop (block 824).

A determination is then made to see if a VPN for site to site access is required (query block 806). If it is not required, then proceed to exit the process (terminator block 826). Otherwise, determine if the site to site VPN exists (query block 828). If it does not exist, then proceed to block 830. Otherwise, install the dedicated equipment required to establish a site to site VPN (block 838). Then build the large scale encryption into the VPN (block 840).

After the site to site VPN has been built or if it had been previously established, the users access the process software via the VPN (block 830). The process software is transported to the site users over the network via tunneling (block 832). That is the process software is divided into packets and each packet including the data and protocol is placed within another packet (block 834). When the process software arrives at the remote user's desktop, it is removed from the packets, reconstituted and is executed on the site user's desktop (block 836). The process then ends at terminator block 826.

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 9A:
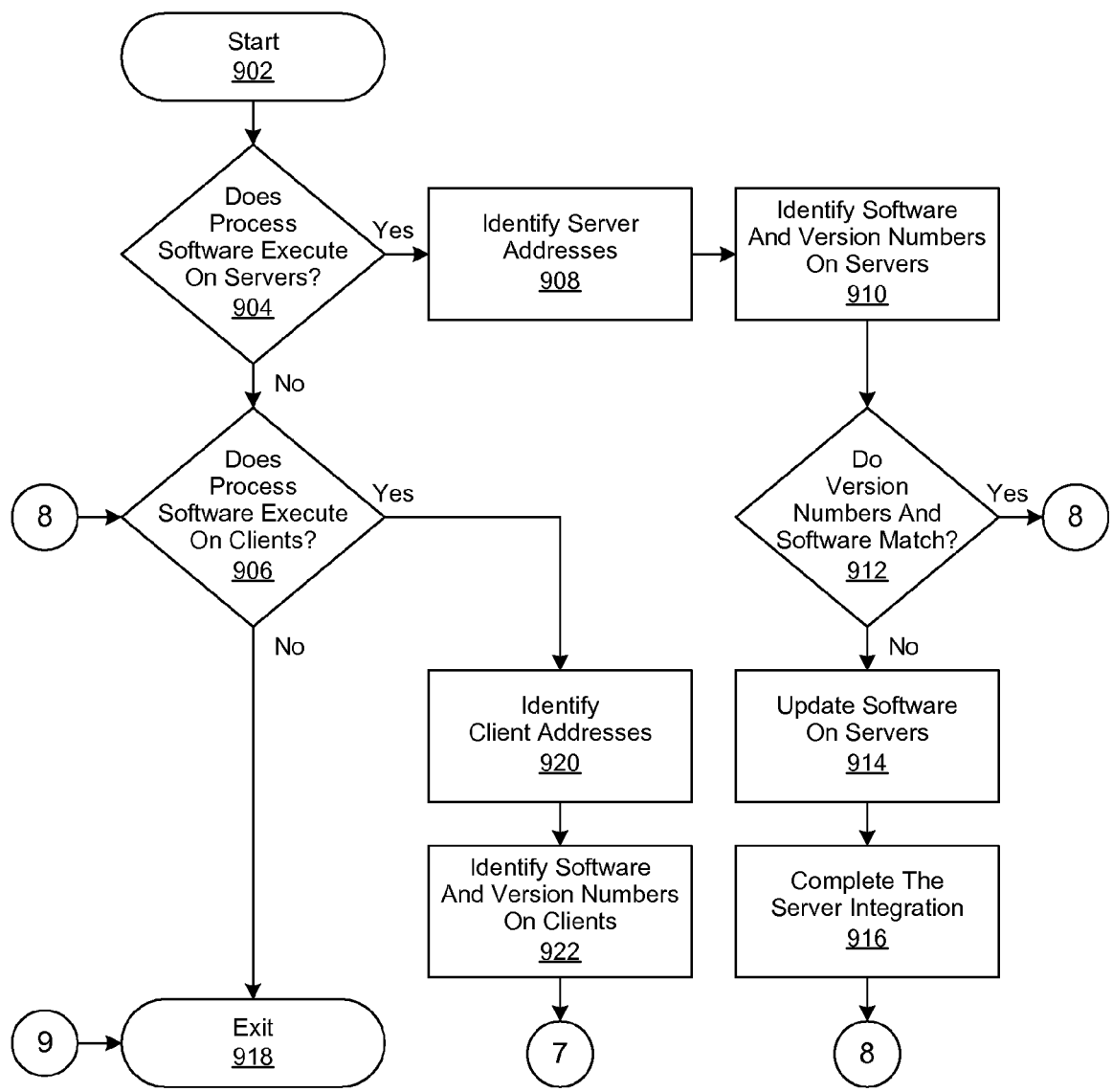
FIGS. 9*a-b* show a flow-chart showing steps taken to integrate into a computer system software that is capable of executing the steps shown and described in FIG. 2.
Figure 9B:
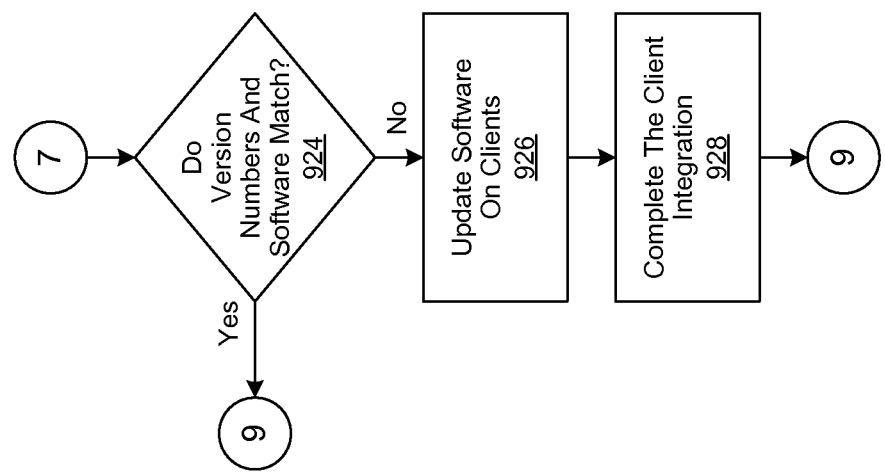

For a high-level description of this process, reference is now made to FIG. 9. Initiator block 902 begins the integration of the process software. The first tiling is to determine if there are any process software programs that will execute on a server or servers (block *Y04*). If this is not the case, then integration proceeds to query block 906. If this is the case, then the server addresses are identified (block 908). The servers are checked to see if they contain software that includes the operating system (OS), applications, and network operating systems (NOS), together with their version numbers, which have been tested with the process software (block 910). The servers are also checked to determine if there is any missing software that is required by the process software in block 910.

A determination is made if the version numbers match the version numbers of OS, applications and NOS that have been tested with the process software (block 912). If all of the versions match and there is no missing required software the integration continues in query block 906.

If one or more of the version numbers do not match, then the unmatched versions are updated on the server or servers with the correct versions (block 914). Additionally, if there is missing required software, it is updated on the server or servers in the step shown in block 914. The server integration is completed by installing the process software (block 916).

The step shown in query block 906, which follows either the steps shown in block 904, 912 or 916, determines if there are any programs of the process software that will execute on the clients. If no process software programs execute on the clients the integration proceeds to terminator block 918 and exits. If this not the case, then the client addresses are identified as shown in block 920.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 922.

A determination is made is the version numbers match the version numbers of OS, applications and NOS that have been tested with the process software (query block 924). If all of the versions match and there is no missing required software, then the integration proceeds to terminator block 918 and exits.

If one or more of the version numbers do not match, then the unmatched versions are updated on the clients with the correct versions (block 926). In addition, if there is missing required software then it is updated on the clients (also block 926). The client integration is completed by installing the process software on the clients (block 928). The integration proceeds to terminator block 918 and exits.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 10A:
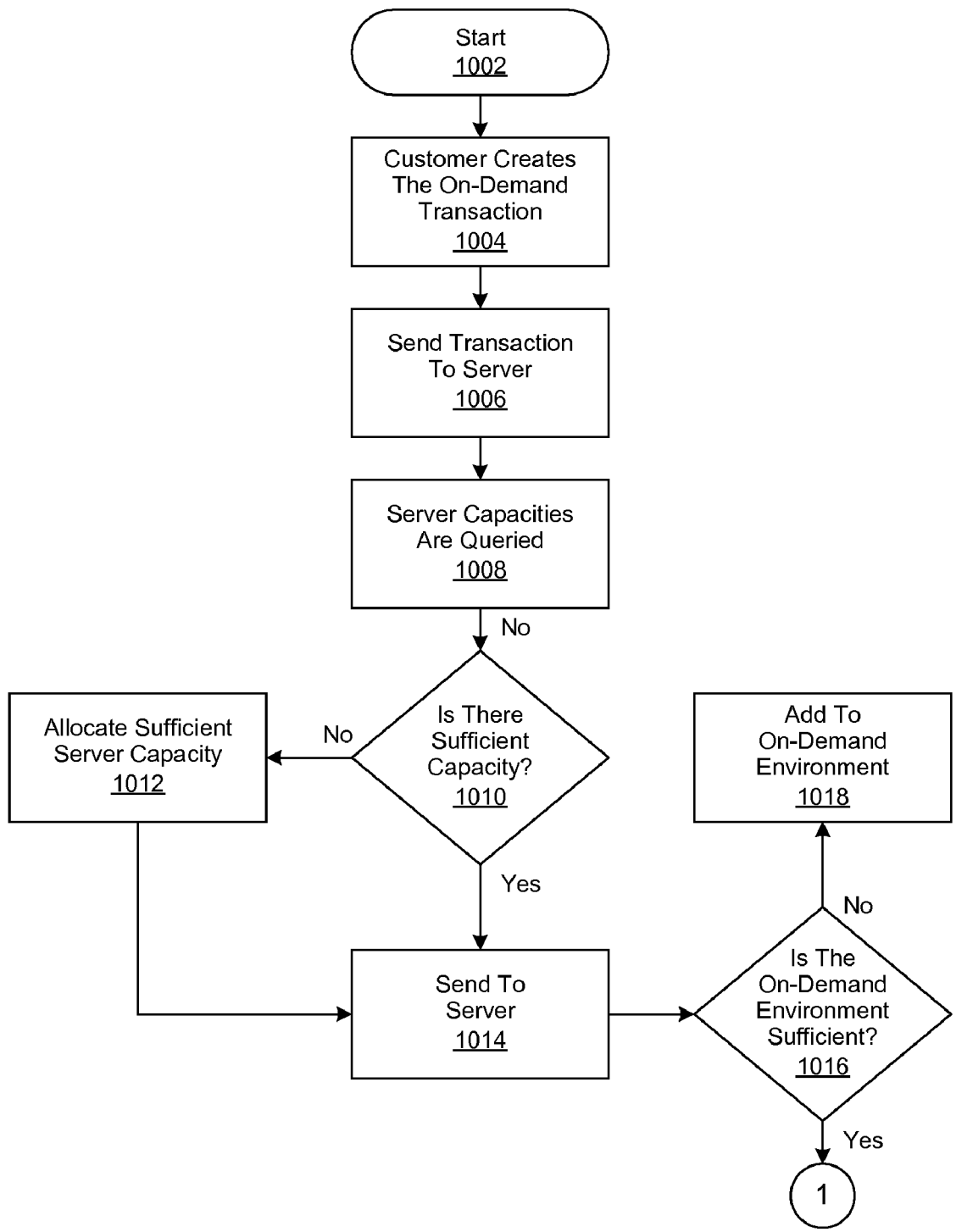
FIGS. 10*a-b* depict a flow-chart showing steps taken to execute the steps shown and described in FIG. 2 using an on-demand service provider.
Figure 10B:
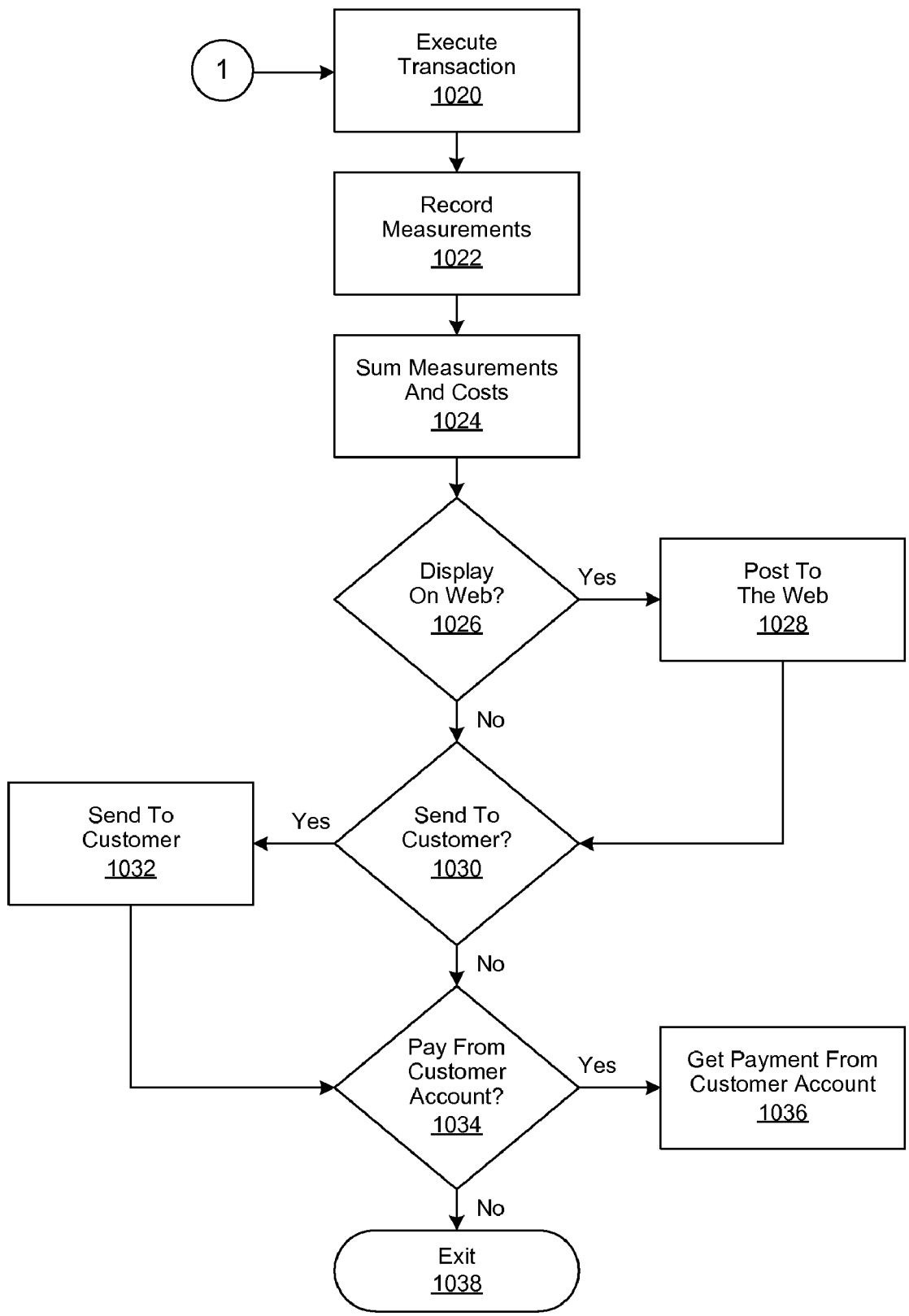

With reference now to FIG. 10, initiator block 1002 begins the On Demand process. A transaction is created that contains the unique customer identification, the requested service type, and any service parameters that further specify the type of service (block 1004). The transaction is then sent to the main server (block 1006). In an On Demand environment the main server can initially be the only server. As capacity is consumed other servers are added to the On Demand environment.

The server central processing unit (CPU) capacities in the On Demand environment are queried (block 1008). The CPU requirement of the transaction is estimated, then the servers available CPU capacity in the On Demand environment are compared to the transaction CPU requirement to see if there is sufficient CPU available capacity in any server to process the transaction (query block 1010). If there is not sufficient server CPU available capacity, then additional server CPU capacity is allocated to process the transaction (block 1012). If there was already sufficient available CPU capacity then the transaction is sent to a selected server (block 1014).

Before executing the transaction, a check is made of the remaining On Demand environment to determine if the environment has sufficient available capacity for processing the transaction. This environment capacity consists of such things as but not limited to network bandwidth, processor memory, storage etc. (block 1016). If there is not sufficient available capacity, then capacity will be added to the On Demand environment (block 1018). Next, the required software to process the transaction is accessed, loaded into memory, and the transaction is executed (block 1020).

The usage measurements are recorded (block 1022). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1024).

If the customer has requested that the On Demand costs be posted to a web site (query block 1026), then they are posted (block 1028). If the customer has requested that the On Demand costs be sent via e-mail to a customer address (query block 1030), then these costs are sent to the customer (block 1032). If the customer has requested that the On Demand costs be paid directly from a customer account (query block 1034), then payment is received directly from the customer account (block 1036). The On Demand process is then exited at terminator block 1038.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:
   creating, via a computer system, a questionnaire relating to a policy;
   electronically distributing, via the computer system, the questionnaire to a plurality of reviewers,
   receiving, via the computer system, responses from the plurality of reviewers to the questionnaire;
   scoring, via the computer system, the responses to the questionnaire to derive quantitative values representing policy guidance parameters; and,
   presenting, via the computer system, a policy depiction plot of the policy guidance parameters, the plot representing adherence and compliance to adherence to a policy guidance system so as to facilitate comprehension of the policy; and wherein
   the questionnaire includes a plurality of segmented questionnaires, each of the plurality of segmented questionnaires including a range of weighted responses; and,
   responses to the questionnaires are aggregated, statistically analyzed and scored based upon the range of weighted responses; and wherein
   the policy depiction plot graphically delineates expected and acceptable behavior and corresponding consequences for noncompliance, the policy depiction plot comprising policy depictions, the policy depictions graphically plotting quantitative values derived from the aggregated, statistically analyzed and scored questionnaire responses as coordinates in a Cartesian format, the Cartesian format representing organization risk along a first axis and disciplinary action along a second axis;
   the policy depiction plot comprises a policy monitoring and enforcement system; and,
   the policy depiction plot is automatically displayed if an action of an employee would be noncompliant with the policy.

2. The computer-implementable method of claim 1 wherein:
   the policy depiction plot is presented whenever the policy is electronically accessed to visually facilitate comprehension of compliance guidelines by a viewer of the policy.

3. The computer-implementable method of claim 1 wherein:
   the policy depiction plot is updated on an ongoing basis as a result of subsequent review and modification of the policy.

4. A system comprising:
   a processor;
   a data bus coupled to the processor; and
   a computer-usable storage medium embodying computer program code, the computer-usable medium being coupled to the data bus, the computer program code comprising instructions executable by the processor and configured for:
   creating a questionnaire relating to a policy;
   electronically distributing the questionnaire to a plurality of reviewers,
       receiving responses from the plurality of reviewers to the questionnaire;
       scoring the responses to the questionnaire to derive quantitative values representing policy guidance parameters; and,
   presenting a policy depiction plot of the policy guidance parameters, the plot representing adherence and compliance to adherence to a policy guidance system so as to facilitate comprehension of the policy; and wherein
   the questionnaire includes a plurality of segmented questionnaires, each of the plurality of segmented questionnaires including a range of weighted responses; and,
   responses to the questionnaires are aggregated, statistically analyzed and scored based upon the range of weighted responses; and wherein
   the policy depiction plot graphically delineates expected and acceptable behavior and corresponding consequences for noncompliance, the policy depiction plot comprising policy depictions, the policy depictions graphically plotting quantitative values derived from the aggregated, statistically analyzed and scored questionnaire responses as coordinates in a Cartesian format, the Cartesian format representing organization risk along a first axis and disciplinary action along a second axis;
   the policy depiction plot comprises a policy monitoring and enforcement system; and,
   the policy depiction plot is automatically displayed if an action of an employee would be noncompliant with the policy.

5. The system of claim 4 wherein:
   the policy depiction plot is presented whenever the policy is electronically accessed to visually facilitate comprehension of compliance guidelines by a viewer of the policy.

6. The system of claim 4 wherein:
   the policy depiction plot is updated on an ongoing basis as a result of subsequent review and modification of the policy.

7. A tangible computer-usable storage medium embodying computer program code, the computer program code comprising computer executable instructions configured for:
   creating a questionnaire relating to a policy;
   electronically distributing the questionnaire to a plurality of reviewers, receiving responses from the plurality of reviewers to the questionnaire;

scoring the responses to the questionnaire to derive quantitative values representing policy guidance parameters; and, presenting a policy depiction plot of the policy guidance parameters, the plot representing adherence and compliance to adherence to a policy guidance system so as to facilitate comprehension of the policy; and wherein the questionnaire includes a plurality of segmented questionnaires, each of the plurality of segmented questionnaires including a range of weighted responses; and, responses to the questionnaires are aggregated, statistically analyzed and scored based upon the range of weighted responses; and wherein the policy depiction plot graphically delineates expected and acceptable behavior and corresponding consequences for noncompliance, the policy depiction plot comprising policy depictions, the policy depictions graphically plotting quantitative values derived from the aggregated, statistically analyzed and scored questionnaire responses as coordinates in a Cartesian format, the Cartesian format representing organization risk along a first axis and disciplinary action along a second axis;

the policy depiction plot comprises a policy monitoring and enforcement system; and, the policy depiction plot is automatically displayed if an action of an employee would be noncompliant with the policy.

8. The tangible computer-usable storage medium of claim 7 wherein:

the policy depiction plot is presented whenever the policy is electronically accessed to visually facilitate comprehension of compliance guidelines by a viewer of the policy.

9. The tangible computer-usable storage medium of claim 7 wherein:

the policy depiction plot is updated on an ongoing basis as a result of subsequent review and modification of the policy.

10. The tangible computer-usable storage medium of claim 7, wherein the computer executable instructions are deployable to a client computer from a server at a remote location.

11. The tangible computer-usable storage medium of claim 7, wherein the computer executable instructions are provided by a service provider to a customer on an on-demand basis.

* * * * *